Patented Nov. 17, 1931

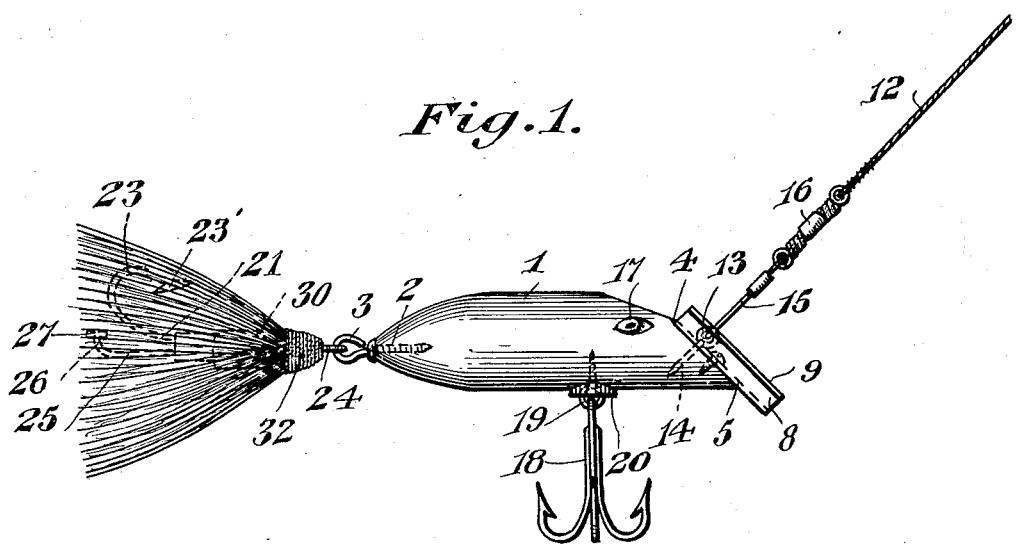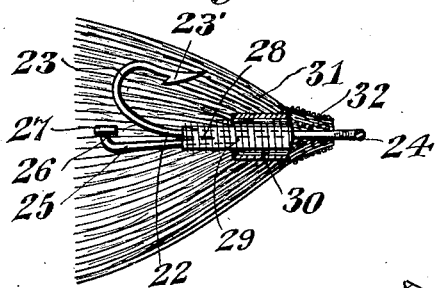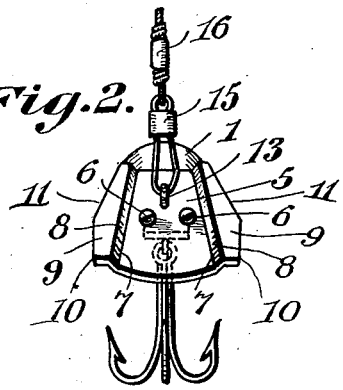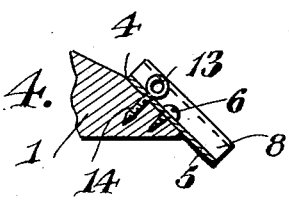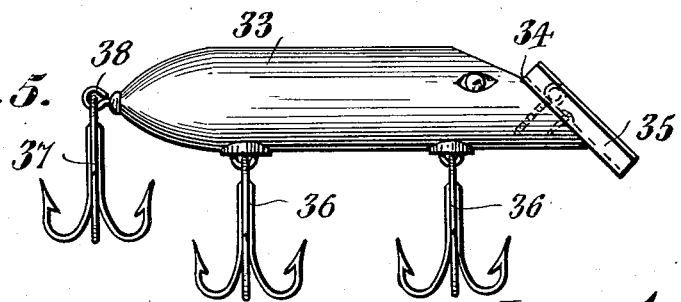

1,832,172

UNITED STATES PATENT OFFICE

LEON A. WINTER, OF MASON CITY, IOWA

FISH LURE

Application filed June 16, 1930. Serial No. 461,573.

This invention relates to fishing and trapping and more particularly to an artificial bait for use when fishing.

One object of the invention is to provide an artificial bait so constructed that when drawn through the water during trolling the bait will have movements closely resembling the movements of a swimming fish and thereby provide a lure which will be very attractive to fish which it is desired to catch.

Another object of the invention is to provide the body portion of the lure with a deflector plate at its forward end so mounted and of such shape that it will cause the lure to have a tendency to move downwardly as it is drawn through the water and also impart transverse darting movements to it.

Another object of the invention is to provide a hook at the rear end of the body of such construction that as the lure is drawn through the water the rear hook will closely resemble a fish's tail and also have movements transversely of the body similar to the movements of a fish's tail when swimming, thereby adding to the realistic appearance of the lure.

Another object of the invention is to so form the rear hook that a piece of bacon rind may be attached thereto when the device is in use.

The invention is illustrated in the accompanying drawings, wherein

Figure 1 is a view showing the improved artificial bait or lure in side elevation, Fig. 2 is a front elevation of the artificial bait, Fig. 3 is a view showing the rear hook partially in elevation and partially in section, Fig. 4 is a fragmentary sectional view through the forward end of the body and deflector plate secured thereto, and Fig. 5 is a side elevation of a modified form of bait.

The body portion 1 of this improved artificial bait or lure may be formed of wood or any other material found suitable. The rear end portion of the body tapers rearwardly, as shown at 2, and at its rear end carries an eye 3 disposed axially of the body. At its forward end the body is formed with a flat face 4 which extends forwardly at a downward incline and against the forward face is disposed a deflector plate 5 firmly secured by screws or equivalent fasteners 6 passed through the plate and into the body. This plate projects forwardly beyond the body in the plane of the front face and is of greater width than the thickness of the body so that its side portions project from opposite sides of the body. These side portions are bent upwardly along rearwardly converging lines 7 to form rearwardly converging flanges 8 and are then bent to form wings 9 which extend in parallel but forwardly offset relation to the intermediate portion of the plate. It should be noted that the wings are substantially triangular in shape, as shown in Figure 2, and gradually increase in width for a portion of the distance from their front ends to their rear ends and then decrease in width. This forms the wings with side edges 10 which diverge rearwardly and intersect side edges 11 converging rearwardly. The rear end of the plate terminates substantially flush with the axis of the body, and in order to connect a line 12 with the body, there has been provided an eye 13 having a threaded stem 14 which passes through the plate and into the body below the axis of the body. Therefore, when the clasp 15 to which the line-engaging swivel 16 is attached to engage through the eye 13, the line will be connected with the body below the axis thereof and as the bait is drawn through the water the plate which extends forwardly at a downward incline will have a tendency to move the bait downwardly in the water. The flanges 8 and side wings 9 constitute surfaces which are acted upon by the water as the bait is drawn through it and cause the bait to turn first in one direction and then in an opposite direction. Therefore, this bait will have transverse movement as well as forward movement as it is drawn through the water and it will be very life-like in its appearance and also light will be reflected by the surfaces of the metal plate. Eyes 17 consisting of glass beads are embedded in sides of the body slightly to the rear of the front face 4 and a hook 18 is suspended beneath the body by a screw eye 19, the threaded shank of which is passed through a metal ring 20 and screwed into the body.

At its rear end the body carries a hook, indicated in general by the numeral 21. This hook is in general construction and appearance similar to a fly hook known as a "Bucktail" hook and this hook is loosely engaged with the eye 3 so that as the bait is drawn through the water the hook may have movement transversely of the body. Therefore, the hook will closely resemble a fish's tail and add to the deceptive qualities of the lure. This hook may be used as an ordinary fly hook instead of as an element of the improved lure and is constructed as clearly shown in Figure 3. Referring to this figure, it will be seen that the hook has a shank 22 having a bill 23 at its rear and terminates in a barb or prong 23'. At the forward end of the shank is formed an eye 24 for engagement with the eye 3. A stem 25 is soldered or otherwise firmly secured against the shank and projects longitudinally therefrom and has its rear end bent upwardly to form a neck 26 terminating in a head 27 so that when a strip of bacon rind is engaged about the stem it will be prevented from slipping off the neck 26 by the head 27. After the stem 25 has been applied to the shank of the hook a narrow strip of silk or other fabric is wrapped about the shank to form a wad 28 and about the wad is disposed a layer 29 of fibrous strands or other suitable material. A wrapping 30 consisting of another narrow strip of silk or other fabric is wound about the inner layer of fibrous material 29 and after this outer wrapping 30 has been applied and firmly secured an outer layer of fibrous material 31 similar to the inner layer is disposed about the wrapping 30 with the forward portions of the strands projecting forwardly beyond the wrapping and these forwardly extending portions of the strands are firmly bound about the forward portion of the shank by threads, as shown at 32. Shellac is now applied to the portions of the fiber which are bound about the shank of the hook in order to firmly hold them in place and water-proof the securing thread. By this arrangement the strands of fiber will be disposed about the hook, as clearly shown in Figures 1 and 2, and serve to conceal the hook and stem to which the pork rind is to be attached and also form a very good representation of a fish's tail when the bait is drawn through the water.

In Figure 5, there has been shown a slightly modified form of bait. In this embodiment of the invention, the body 33 is similar in construction to the body 1 and is formed at its forward end with an inclined surface 34 and having secured thereto a deflector 35 of the same construction as the deflector 5. Two hooks 36, which are similar in construction to the hook 18, are secured in spaced relation to each other longitudinally of the body in place of a single hook being used and at the rear end of the body a hook 37, similar to the hooks 18 and 36, is attached to the rear eye 38 of the body instead of a hook of the construction shown in Figures 1 and 3. The operation of this form of bait is similar to that previously described.

Having thus described the invention, I claim:

1. A fish lure comprising a body having a front face extending forwardly at a downward incline and a flat surface above the front face extending rearwardly at an upward incline, a deflector plate secured against the front face of said body with its upper end terminating at the rear end of the front face, said plate projecting forwardly in the plane of the front face beyond the front end thereof, means at the front of the body engaged through the plate and front face thereof for attaching the same to a fishing line, and a hook carried by said body.

2. A fish lure comprising a body having a front face extending forwardly at a downward incline, a deflector plate secured against the front face of said body and projecting from the front end of the body in the plane of the face for directing the body downwardly when drawn through water, said plate having side portions projecting from opposite sides of the body and bent along rearwardly converging lines to form wings offset forwardly from the intermediate portion of the plate and, serving to impart transverse motion to the body, means at the front of the body for attaching the same to a fishing line, and a hook carried by said body.

3. A fish lure comprising a body having a front face extending forwardly at a downward incline, a deflector plate secured against the front face of said body and projecting forwardly from the front end of the body in the plane of the front face for directing the body downwardly when drawn through water, said plate having side portions projecting from opposite sides of the body and bent along rearwardly converging lines to form wings offset forwardly from the intermediate portion of the plate and serving to impart transverse motion to the body and flanges connecting the wings to the intermediate portion of the plate extending from the intermediate portion of the plate in diverging relation to each other, means at the front of the body for attaching the same to a fishing line, and a hook carried by said body.

4. A fish lure comprising a body having a front face extending forwardly at a downward incline, a deflector plate secured against the front face of said body and projecting forwardly from the front end of the body in the plane of the front face for directing the body downwardly when drawn through water, said plate having side portions projecting from opposite sides of the body and bent along rearwardly converging lines to form wings offset forwardly from the intermediate portion of the plate and having their outer side edges cut to form forward portions diverging rearwardly and intersecting rear portions which converge rearwardly, said wings constituting surfaces to impart transverse motion to the body, means at the front of the body for attaching the same to a fishing line, and a hook carried by said body.

In testimony whereof I affix my signature.

LEON A. WINTER. [L. S.]